April 6, 1965    J. M. ANDERSON    3,176,945
ADJUSTABLE CABLE STRAPS
Original Filed May 23, 1962

INVENTOR.
JOHN M. ANDERSON
BY
Wheeler, Wheeler & Wheeler
ATTORNEYS

United States Patent Office 3,176,945
Patented Apr. 6, 1965

3,176,945
ADJUSTABLE CABLE STRAPS
John M. Anderson, 416 W. Maple St.,
Sturgeon Bay, Wis.
Continuation of application Ser. No. 197,150, May 23, 1962. This application Oct. 3, 1963, Ser. No. 313,631
4 Claims. (Cl. 248—71)

This invention relates to an adjustable cable strap or staple which has a universally adjustable span to fit cable of different widths.

This application is a continuation of my copending application Serial No. 197,150, filed May 23, 1962, now abandoned.

Present practice requires electricians, etc., to carry a series of cable straps or staples of different sizes to fit various cable sizes. According to the present invention, a single cable strap or staple which has an adjustable span for universal application to any cable supplies all the needs of the electrician. Thus the electrician need carry only one type of cable strap which is universally applicable to all cable.

While the invention will be described in connection with its application to non-armored electrical cable, it will be clear to those skilled in the art that other types of cable, pipes, conduits, etc., may be advantageously anchored with the cable strap of the present invention.

In preferred embodiments of the invention, the cable strap comprises a wire bridge having convolutions transverse to the span. The convolutions are yieldable along said span to adjust the span to fit the cable. Where non-metallic cable is used, the wire bridge is desirably provided with a non-conductive plastic coating.

Other features, advantages and objects of the invention will appear from the following disclosure in which.

Figure 1:
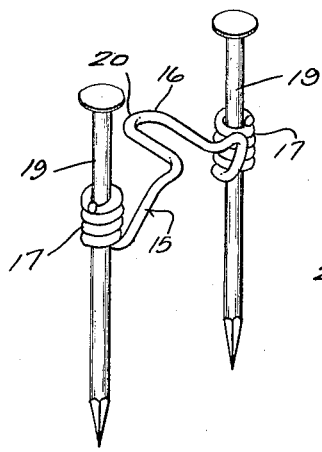
FIG. 1 is a perspective view of a cable strap or staple embodying the invention.
Figure 3:
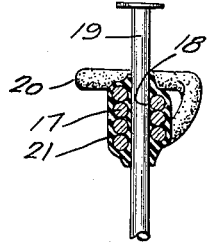
FIG. 3 is an axial cross section taken through one of the plastic coated terminal coils of the wire bridge of the staple shown in FIG. 2.
Figure 2:
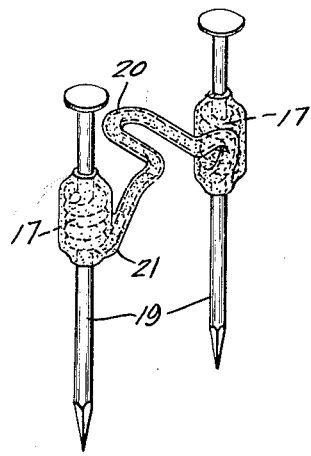
FIG. 2 is a perspective view of a cable strap or staple similar to the one shown in FIG. 1, but in which the wire portions thereof are covered with a plastic coating.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In one of its simplest embodiments, the cable strap or staple of the present invention consists of a length of wire 15, which has a bridge portion 16 and terminal coils 17. The coils 17 provide nailways 18 disposed on parallel axes for the cable strap anchoring nails 19.

As is also described in my U.S. Patent 3,085,129, granted April 9, 1963, the bridge 16 and end coils 17 are desirably coated with a non-conductive plastic material 21. This is of particular advantage where the strap is to be used to anchor non-metallic cable.

The wire 15 may be copper or steel with a copper or other rust-proof protective coating. In any event, the bridge 16 is formed into convolutions 20 so that the lineal length of the wire 15 greatly exceeds the span of the bridge. The wire convolutions are flexible or yieldable in the direction of the span of the bridge, as indicated in FIGS. 4–9, so that the span is adjustable to fit the cable strap onto cables 22, 23, 24 of different widths. For example, cable 22 may be ⅜ of an inch in width, cable 23 may be ⅝ of an inch in width, and cable 24 may be ⅞ of an inch in width.

The wire 15 is sufficiently stiff to remain in any position to which it is adjusted, but is sufficiently yieldable to expand under the pressure of any conventional spreading tool to its configurations shown in FIGS. 5, 6, 8 and 9. The wire may also be expanded under finger pressure.

In preferred embodiments of the invention, the wire 15 has a diameter of .045 inch.

Figure 4:
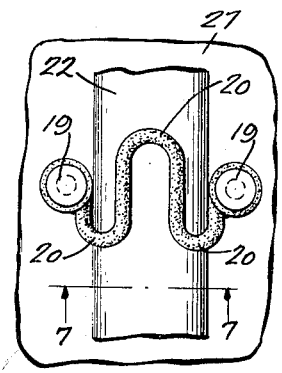
FIGS. 4, 5 and 6 are fragmentary plan views showing the cable strap or staple of the present invention applied to cables of different widths, the span of the staple in each view being adjusted correspondingly to fit each such cable.
Figure 5:
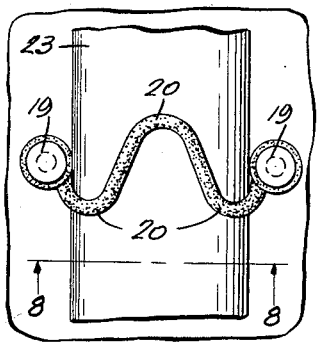

The workman carries a supply of staples fabricated according to the present invention and a spreading tool. The staples will ordinarily be fabricated in their narrowest form, as shown in FIG. 4. The workman will quickly adapt the staple to any larger cable by flexing its convolutions 20, as aforestated.

The end coils 17 of the wire 15 provide nailways which will guide the nails 19 under the blows of a hammer or the like to anchor the ends of the cable strap into a cable support, which is shown here by way of example to consist of wooden members 27.

Figure 6:
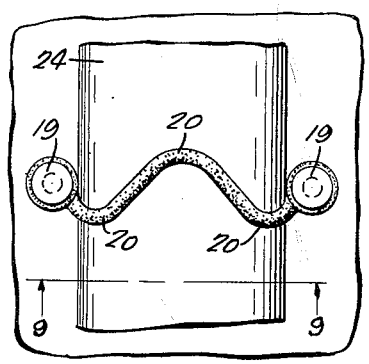
Figure 7:
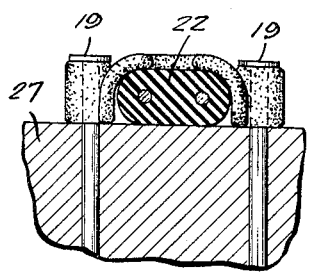
FIGS. 7–9 are cross sections taken through the cables along the indicated lines of FIGS. 4–5 respectively.
Figure 8:
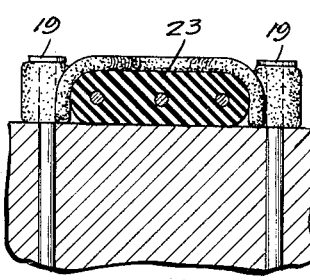
Figure 9:
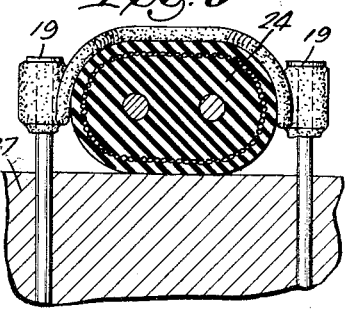

The end portions of the wire bridge desirable extend downwardly, as shown, to connect the bridge to the bottommost coils of the nailways. Accordingly, these downwardly extending wire portions embrace the sides of the cable. The nails 19 in their nailways also embrace the sides of the cable. The top of the nailways are desirably at the level of the bridge 16. Accordingly, when the nails are set their heads are at substantially the level of the bridge where they are exposed to the blows of the hammer. This is substantially true even when an oversize cable is involved, as shown in FIG. 6. The spread of the bridge and the elevation of the nail heads above the support 27 exposes the nail heads to the hammer without interference from the cable or cable strap.

I claim:

1. An adjustable span cable strap comprising a flexible wire having its ends formed into two sets of multiple coils disposed on laterally spaced substantially parallel axes and providing nailways, nails in said nailways, convolutions in said wire between said nails to form a cable strap bridge having an adjustable span between said nails, said nailways holding said nails upright along the sides of the cable for adjustment of the lateral spacing therebetween by altering the configuration of said convolutions.

2. The cable strap of claim 1 in which said wire has a plastic coating.

3. The cable strap of claim 1 in which the tops of said nailways are at substantially the same level as the bridge whereby to support the nails with their heads at substantially said level.

4. The cable strap of claim 1 in which said wire further comprises downwardly extending portions connecting the said bridge portion to the bottommost coils of the multiple coils of the nailways and embracing the sides of the cable.

References Cited by the Examiner
UNITED STATES PATENTS

| | | | |
|---|---|---|---|
| 651,482 | 6/00 | Greenfield | 248—74 |
| 843,632 | 2/07 | Schafer | 248—74 |
| 934,663 | 9/09 | Folger | 248—74 |
| 2,162,340 | 6/39 | Peterman | 248—74 |
| 2,418,539 | 4/47 | Anderson | 85—49 X |
| 2,526,902 | 10/50 | Rublee | 174—159 |

JOHN F. BURNS, *Primary Examiner.*

JOHN P. WILDMAN, *Examiner.*

UNITED STATES PATENT OFFICE
CERTIFICATE OF CORRECTION

Patent No. 3,176,945                        April 6, 1965

John M. Anderson

It is hereby certified that error appears in the above numbered patent requiring correction and that the said Letters Patent should read as corrected below.

Column 2, line 25, for "desirable" read -- desirably --; line 57, strike out "portion".

Signed and sealed this 17th day of August 1965.

(SEAL)
Attest:

ERNEST W. SWIDER                            EDWARD J. BRENNER
Attesting Officer                                Commissioner of Patents